Figures 1, 2:
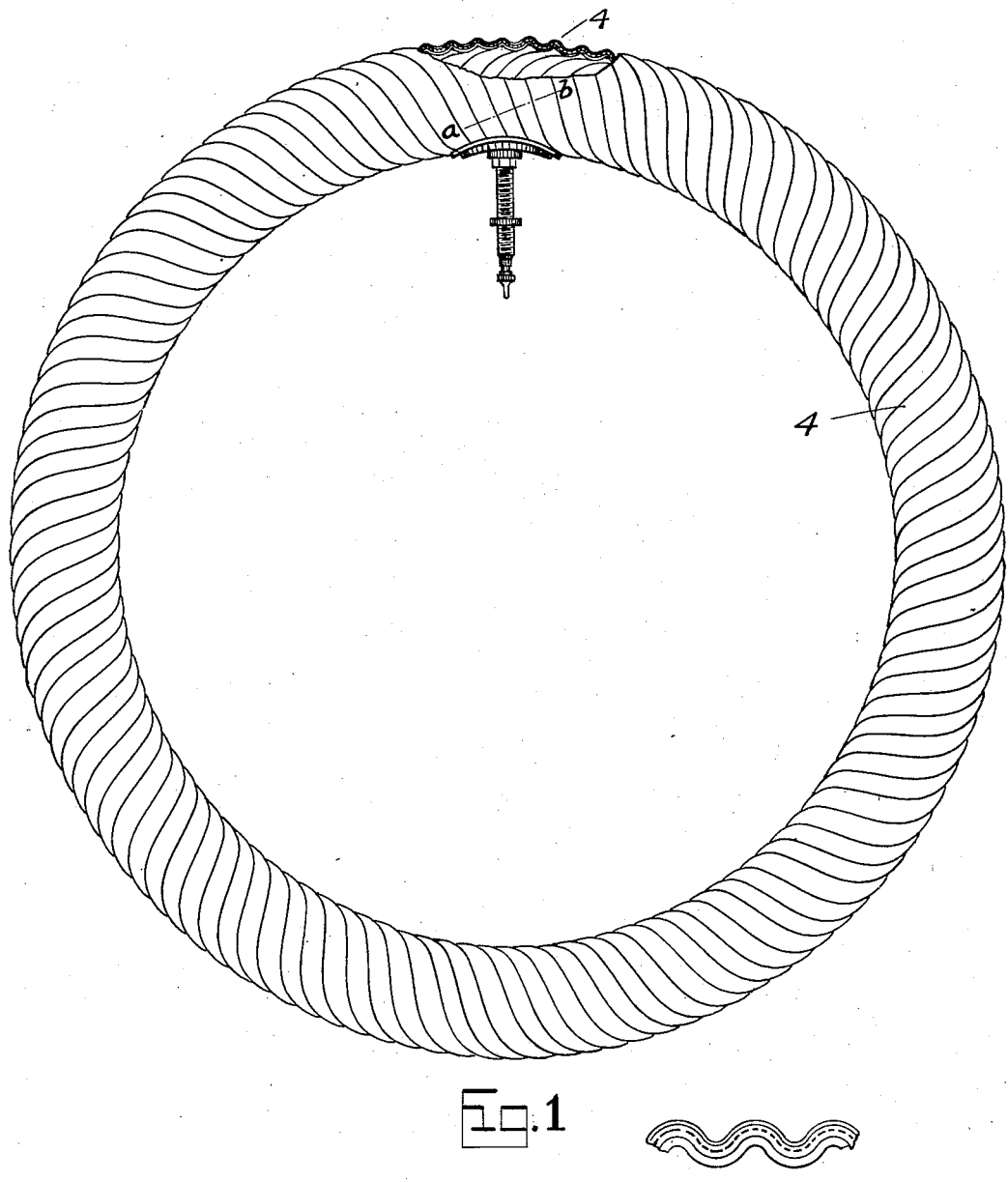

A. DOW.
PNEUMATIC TIRE.
APPLICATION FILED AUG. 18, 1913.

1,120,916.  Patented Dec. 15, 1914.
2 SHEETS—SHEET 1.

WITNESSES:  INVENTOR
 Alexander Dow
 BY
 Browne & Phelps
 ATTORNEY

A. DOW.
PNEUMATIC TIRE.
APPLICATION FILED AUG. 18, 1913.

1,120,916.

Patented Dec. 15, 1914.
2 SHEETS—SHEET 2.

WITNESSES:

INVENTOR
Alexander Dow
BY
ATTORNEY

UNITED STATES PATENT OFFICE.

ALEXANDER DOW, OF NEW YORK, N. Y., ASSIGNOR TO HELIX TUBE CO., INC., A CORPORATION OF NEW YORK.

PNEUMATIC TIRE.

1,120,916.  Specification of Letters Patent.  Patented Dec. 15, 1914.

Application filed August 18, 1913. Serial No. 785,421.

*To all whom it may concern:*

Be it known that I, ALEXANDER DOW, a citizen of the United States of America, and a resident of New York city, county and State of New York, have invented certain new Improvements in Pneumatic Tires, of which the following is a specification.

My invention relates to an improvement in pneumatic tires and has particular reference to a means for preventing the escape of air from the interior of the tire after the outer shoe, or casing, bursts from the internal pressure.

Broadly speaking, the subject matter of my invention pertains to a means of giving to the tire a reserve capacity, by embodying in it elements capable of resisting the pressure of the confined air and preventing its escape, which elements are under no tension or bursting stress in any direction and only perform their function when the normal means adapted to retain the air pressure have failed.

In my previous application No. 779,383, filed July 16, 1913, I have described the use of a reserve fabric capable of withstanding the bursting pressure of the air contained within the pneumatic tire, this fabric being disposed in a manner, either within the casing, or in the inner tube, or in a tire protector located between the inner tube and the casing, not to be under any tension as the result of the compressed air within the tire.

The purpose of my invention is to have all the bursting stress of the contained air exerted upon the fabric of the shoe, and no tension of bursting stress in any direction exerted upon the reserve fabric contained in the tire, so that in case the working fabric of the shoe fails or explodes as the result of wear or weakening of the fabric, that portion of the inner tube, or tire protector, adjacent to the ruptured portion of the shoe can expand in any direction to a certain degree, after which it can expand no further and its strength will serve to prevent the explosion of the inner tube and the release of the air within it.

In my previous application I have described the method of embodying the fabric in corrugations or otherwise so that under the pressure of the air this fabric will be under no tension whatever until after the shoe containing the working fabric has failed. My present invention, however, differs from this, in that instead of having the reserve fabric in a neutral condition, or without tension, while the fabric of the shoe is in tension, the fabric of the inner tube or tire protector is placed under a condition of compression.

In my previous application referred to, one method of employing a reserve fabric in the tire was specifically shown and described as being embedded within the rubber of the inner tube in the form of helical corrugations, the exterior of the tube being of circular form and the interior either circular or corrugated. As constructed in this way, the fabric was maintained in a corrugated form when the tire was inflated, and was not under any tension, but was entirely slack at all points. The purpose of the corrugations being helical as described is to give to the tube such a circumferential elasticity as may be needed to permit of the bending of the tube from a straight to a circular form without rendering the reserve fabric tense, and also to permit it to remain circumferentially slack after its inflation in tire of varying diameters. In the inner tube which is the subject of this invention, however, the helically corrugated fabric is covered with rubber within and without, so that both the interior and exterior of the tube is corrugated, the walls of the tube being practically of uniform thickness. Upon inflating this tube within the shoe the corrugated fabric is flattened out by the air pressure, and the tube lies snugly against the interior of the shoe, with the reserve fabric of the tube in a state of compression, while the fabric of the shoe is in a state of tension. In consequence of this, upon the bursting of the outer shoe or casing, the inner tube is capable of expanding in any direction, at the point where the casing has parted, until the fabric has lost the compression it was under, and has assumed the necessary tension to retain the air pressure of the tire. Another advantage of placing the reserve fabric in a state of compression is that it is thereby rendered more dense and becomes a greater protection against the puncture of the rubber of the inner tube. Further, this reserve fabric upon encountering a puncturing instrument is not apt to suffer damage, as its slack condition permits of its motion to a considerable degree before becoming sufficiently tense to have a hole made in it.

I have illustrated my invention in the accompanying drawings, designating the parts by numerals, referring to like parts by like numerals.

Figure 3:
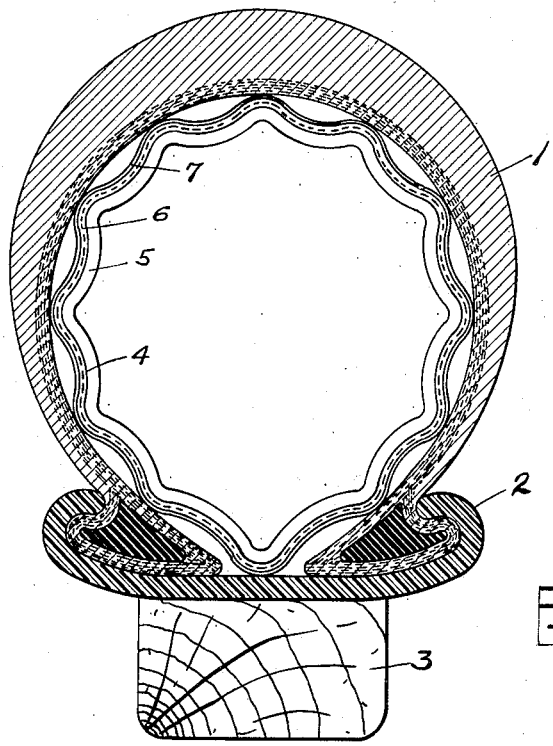
Figure 4:
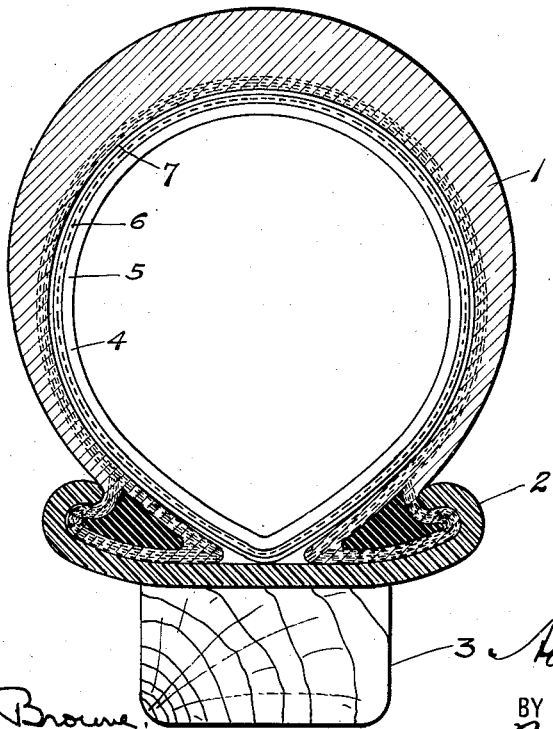

In these drawings Figure 1 is a side elevation of an inner tube, partly in section and containing an embodiment of my invention; Fig. 2 is a section of the wall of the inner tube on the line a—b, showing the corrugated reserve fabric with rubber on the exterior and interior of it; Fig. 3 is a cross section of the inner tube as contained within a casing, and before the inner tube is inflated. Fig. 4 is the same view with the inner tube fully inflated.

In Fig. 1 the inner tube is shown as being formed in helical corrugations extending about it. A section of this is shown exhibiting a circumferential wave.

In Fig. 2 is shown a section of the corrugations on the line a—b, which is the true form of the corrugations, and shows the center line of the fabric as being in a uniform wave.

In Fig. 3, 1 is a section of an ordinary shoe or outer casing of a pneumatic tire, attached to the rim 2, mounted on the felly 3. 4 is a section of the inner tube, in the corrugated form provided with reserve fabric. 5 is the interior rubber wall of the tube 4. 6 is the layer of the reserve fabric. 7 is the outer or protecting layer of rubber on the exterior of the tube. In this figure the inner tube 4 is shown without being inflated.

In Fig. 4, 1 is the casing, attached to the rim 2, mounted on the felly 3, and containing the inner tube 4 after the same has been inflated. In this view, the corrugations having been flattened out, the walls of rubber 5 and 7, and the reserve fabric 6, lie in concentric layers, in a state of compression, snugly fitting the interior of the casing 1. The fabric in this case, as in my copending application above referred to, has a diagonal of the weave extending parallel with the crests of the corrugations or, in other words, the fabric is laid on the bias, thereby to yield in any desired direction and take up the strain of inflation. This will permit the fabric to expand circumferentially, laterally or otherwise upon the normal operation of inflating the tire.

In constructing an inner tube of this character, the periodicity and amplitude, as well as the obliquity, of the corrugations can be calculated by a determination of the percentage of compression both lateral and circumferential desired in the inner tube when the tire is inflated.

While I have described particularly the embodiment of the reserve compressed fabric in the shoe or inner tube, it can also be located in an interior tire protector, between the tube and the outer casing, thus limiting the further expansion of the inner tube beyond a certain prescribed amount when the normal pressure resisting fabric has failed.

I realize that considerable variation is possible in the method of laying the fabric within the tire without departing from the spirit of my invention, and I do not, therefore, intend to limit myself to the specific arrangement here shown and described for incorporating the compressed reserve fabric in the tire. It is immaterial whether these helical corrugations be regular or irregular, the purpose of their particular arrangement being to afford a universal compressed condition of the reserve fabric adjacent to any point where the working fabric may part, which reserve fabric can then most readily lose its compression and become under tension, and prevent further expansion of the tube. It is further apparent that instead of corrugations, hemispherical depressions could be made in the fabric or other forms which would give to it a possibility of universal extension, without departing from the spirit of my invention.

While I have described specifically the use of a helical corrugated reserve fabric in the inner tube or tire protector, such an embodiment can be made in the outer casing as to effect a similar result, by having contained in the outer casing certain layers of fabric under tension, and another series of layers under compression when the tire is inflated. Under these circumstances, the tense working layers of fabric can fail and part upon which the reserve layers can take the stress and prevent the rupture of the air containing tube.

Having set forth the nature and objects of my invention what I claim and desire to secure by Letters Patent is:

1. An inner tube for pneumatic tires formed of rubber, the rubber being corrugated diagonally, a layer of fabric embedded in the body and extending throughout the entire body portion thereof, said fabric being corrugated to conform to the corrugations of the rubber in which it is embedded and having the diagonal of the weave extending along the crests of the corrugations.

2. An inner tube for a pneumatic tire formed of rubber, the rubber being corrugated diagonally, a plurality of layers of fabric embedded in the body and extending throughout the entire body portion thereof, said fabric being corrugated to conform to the corrugations of the rubber in which it is embedded and having the diagonal of the weave extending along the crests of the corrugations.

3. An inner tube for a pneumatic tire formed of rubber and diagonally corrugated throughout its entire length, a layer of fabric embedded in the body portion, the said fabric being on the bias with respect to the corrugations.

4. An inner tube for a pneumatic tire formed of resilient material and having embedded therein layers of fabric, both the resilient material and the fabric being diagonally corrugated whereby the tube is under compression in all directions when inflated in a shoe of proper size and may expand circumferentially and longitudinally.

In testimony whereof I affix my signature in presence of two witnesses.

ALEXANDER DOW.

Witnesses:
SAMUEL KAHN,
GEORGE L. MORRIS.